INVENTORS
RICHARD H. HOLMWOOD
KENNETH E. ANDERSON
BY Geoffrey Knight
ATTORNEY

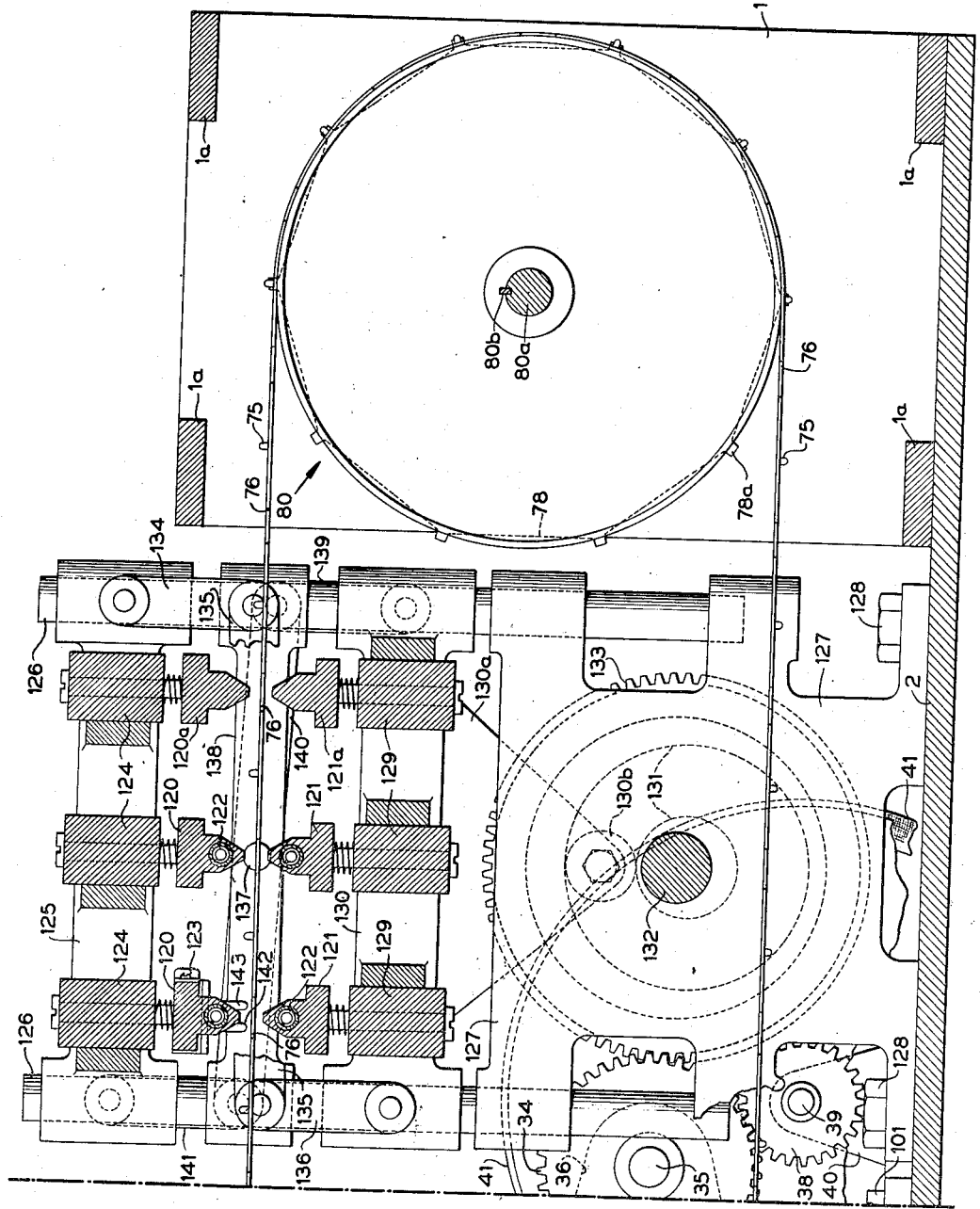

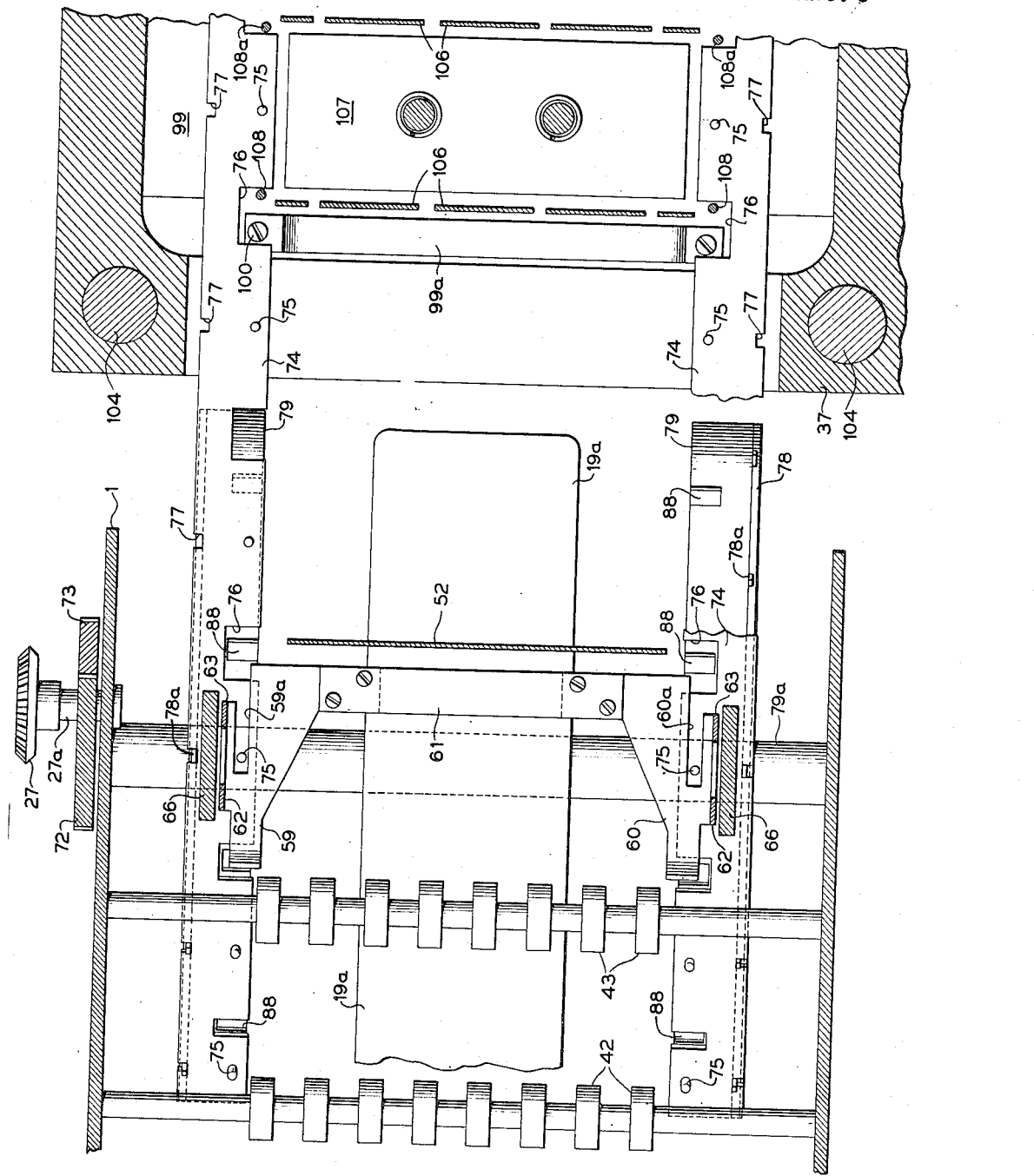

*INVENTORS*
RICHARD H. HOLMWOOD
KENNETH E. ANDERSON
BY Geoffrey Knight
ATTORNEY

INVENTORS
RICHARD H. HOLMWOOD
KENNETH E. ANDERSON
BY Geoffrey Knight
ATTORNEY

United States Patent Office 2,758,518
Patented Aug. 14, 1956

2,758,518

WEB ASSEMBLING MACHINE

Richard H. Holmwood, Binghamton, and Kenneth E. Anderson, Johnson City, N. Y., assignors to International Business Machines Corporation, New York, N. Y., a corporation of New York Application May 12, 1953, Serial No. 354,448

6 Claims. (Cl. 93—1)

This invention relates to strip assembling apparatus and more particularly to apparatus of the character which is adapted to produce a continuous web assembled from strips having a coating of adhesive along transverse marginal areas.

The strips for which the invention is particularly adaptable are comprised of a central record portion having detachable side marginal sections or areas and predefined transverse marginal areas provided with a coating of adhesive, the side marginal areas being provided with spaced perforations adapted for engagement with a pin type conveyor forming a part of the invention.

In general, the invention comprises a feed for holding a stack of strips and from which the strips are fed singly into an assembling station comprising a strip interceptor, an intermittently driven conveyor, and a ram for positioning each strip into engagement with the conveyor. The conveyor is advanced in a step-by-step manner and in timed relation to the vertical movements of the ram. After receiving a strip the conveyor is advanced, by means of an intermittent drive mechanism, a step equivalent to the width of a strip less the width of a transverse marginal area to thereby position the rear transverse marginal area of the advanced strip for overlapping engagement with the front marginal area of the next succeeding strip fed upon the conveyor. The overlapped strips are then advanced by the conveyor in step-by-step manner to a die station which cuts the strip along interrupted lines thereby defining the transverse marginal areas from the central record portion. A further step advances the overlapped strips to a sealing station whereat heat and pressure are applied to the overlapped adhesive covered areas to secure the same while they are maintained in an accurate overlapped relationship. The connected strips emerging from the machine form a continuous web which may be conveniently folded into a zig-zag pack. The continuous web forms the subject matter of a copending application to R. H. Holmwood, Serial No. 242,198, filed August 17, 1951, now Patent No. 2,700,556.

The need for such a continuous web stems from the fact that the progress in the punched card controlled accounting art, notably in the speed of operation of the electric accounting machine, has advanced well beyond the speed of operation of so called auxiliary punched card controlled bill feeding devices heretofore adapted for feeding individual strips to the accounting machine printing mechanism.

Modification of the existing bill feeding devices to adapt them for use with the present accounting machines would be rather expensive. This costly approach is entirely obviated by employing an accurately assembled continuous web in place of individual strips, in view of the fact that web feeding devices are relatively faster and more readily adaptable to the electric accounting machines.

Accordingly, the principal object of the invention is the provision of an apparatus for rapidly and accurately assembling individual strips into a continuous web by overlapping marginal areas having an adhesive coating.

Other objects of the invention will be pointed out in the following description and claims and illustrated in the accompanying drawings, which disclose, by way of example, the principle of the invention and the best mode, which has been contemplated, of applying that principle.

In the drawings:

Fig. 2 is a plan view showing in part the ram assembly, the conveyor tapes, the tape driving drums, and a portion of the die station.

Fig. 3 is a section of the ram and its operating mechanism taken along the line 3—3 in Fig. 1a.

Figure 1:
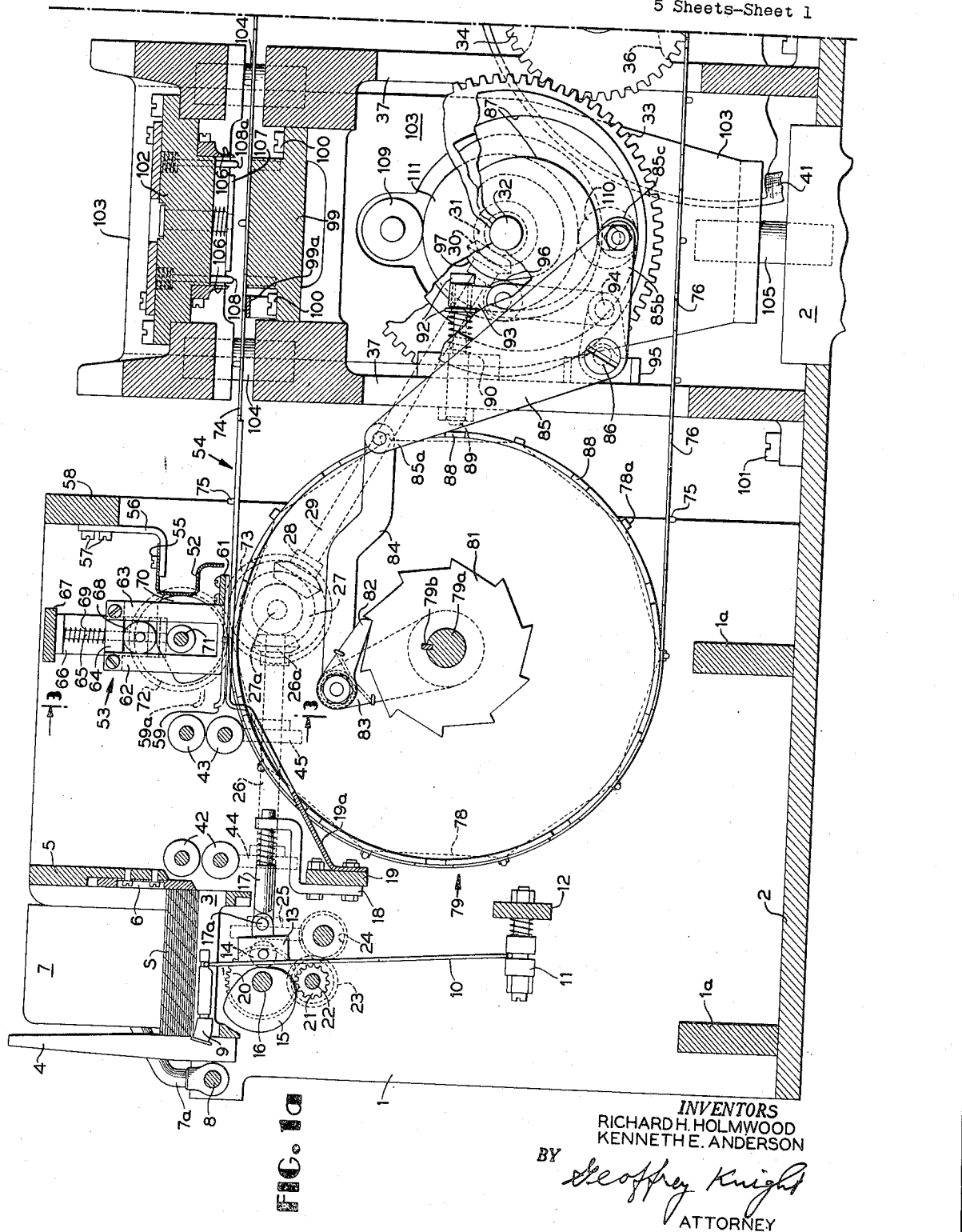
Figs. 1a and 1b show a cross sectional view of the entire machine disclosing the feed mechanism, the strip assembling station including the conveyor, the die station and the sealing station.

The structure of the machine may be appreciated from the cross sectional views of Figs. 1a and 1b where there are shown a feed, an assembling station including a conveyor, a die station and a sealing station. These components are suitably mounted between vertical side frames such as 1, spaced from each other by means of connecting bars 1a, suitably attached to a main frame 2 supported by legs not shown.

Feed

The feed comprises a base 3, suitably attached to the side frames 1a, a pair of front guide posts 4, a rear wall 5 adapted with an adjustable throat knife 6, and side walls 7 each of which is attached to an arm 7a slidably carried on a horizontal rod 8 disposed between the side frames 1, the side walls 7 being adjustable to accommodate various sized strips. The base 3 is provided with a pair of grooves each of which guides a picker knife 9 reciprocated to cause strips to be fed singly into the machine. The picker knives are loosely connected to a link 10 in turn pivotally secured to an adjustable pivoting means 11 supported by a crossbar 12. The link 10 is provided with a block 13 carrying a roller 14 disposed to cooperate with a cam 15 secured to a shaft 16 suitably journaled in the side frames 1. Rotation of the cam 15, by means to be described, causes the picker knives 9 to advance to feed strips singly through a throat opening formed between the throat knife 6 and the base 3. The return of the feed knives to the position shown is effected by means of a spring biased plunger 17 freely connected at 17a to the block 13 and suitably guided on its opposite end by means of a bracket 18 attached to a crossbar 19. Said crossbar 19 also has mounted thereon a guide plate 19a which as best seen in Fig. 2, serves to support and guide the strips into and out of the strip assembling station. The drive means for rotating the shaft 16 and the cam 15 comprises a gear 20 pinned to said shaft 16, a gear 21 secured to a shaft 22, a gear 23 also secured to shaft 22, a gear 24 meshing with the latter gear 23, a gear 25 engaged with gear 24 and pinned to a horizontal shaft 26 suitably journaled on the side frame 1. The shaft 26 terminates in a beveled gear 26a which meshes with another beveled gear 27 secured to a stud shaft 27a journaled in the frame 1. Said gear 27 also meshes with a beveled gear 28 pinned to a shaft 29 suitably journaled on the side frame 1 and a supporting frame not shown. This shaft 29 also terminates in a beveled gear 30 meshing with a beveled gear 31 secured to a shaft 32 suitably journaled in supporting frames not shown. Pinned to this shaft 32 is a large drive gear 33 engaged to a gear 34 secured to a shaft 35 journaled in brackets 36 forming a part of a die frame 37 secured by means of bolts 101 to the base frame 2. The gear 34 meshes with a gear 38 pinned to a shaft 39 journaled in brackets 40 attached to the base frame 2. The shaft 39 has also pinned thereon a large drive pulley 41 driven by means of a belt, not shown, and a motor, not shown, attached to the under side of the base frame 2. Thus, by the means described the picker knives 9 are operated to cause the feeding of strips into the machine. The strips are carried into the strip assembling station by means of feed rolls 42 and 43 driven by means of gears 44 and 45, pinned to the shaft 26, and which engage associated gears, not shown, pinned to the feed rolls 44 and 45.

The strips

Figure 7:
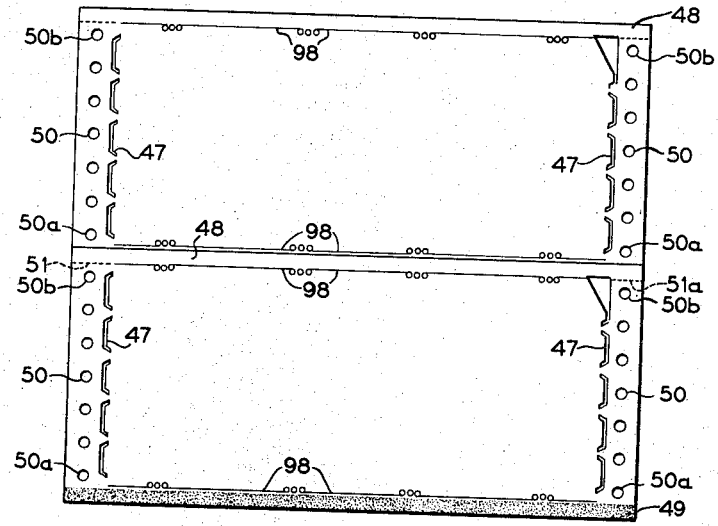
Fig. 7 shows a portion of the final assembled continuous web.
Figure 6:
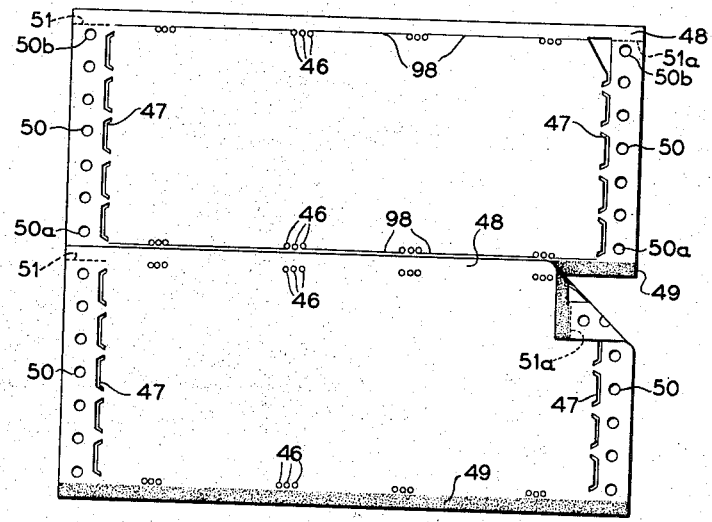
Fig. 6 is a plan view of the strips assembled by means of the assembling station and showing additional details on the leading strip performed by the cutters in the die station.
Figure 5:
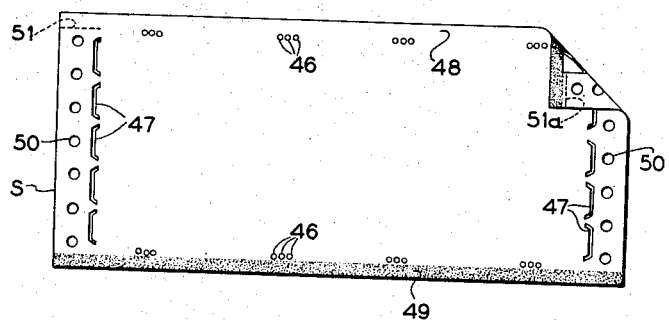
Fig. 5 is a plan view of an individual strip showing details of construction.

The strips are fully explained in the copending application to R. H. Holmwood, Serial No. 242,198, filed August 17, 1951, now Patent No. 2,700,556. Referring to Fig. 5, the strip S is comprised of tabulating card stock and contains groups of small perforations 46 spaced along both transverse margins 48 and 49. The under surface of the margin 48 and the upper surface of the margin 49 are provided with a coating of adhesive. The strip is further provided with spaced marginal perforations 50 and as further seen in Figs. 6 and 7 these perforations 50 and others designated as 50a and 50b are of the same diameter and are equally spaced from each other. The perforations designated 50 are adapted for engagement with tape pins 75 forming a part of the conveyor 54 whereas the perforations 50a and 50b are adapted for engagement with aligning pins disposed within the die and sealing stations. The strip S, Fig. 5, is further provided with short lines of cleavage 51 and 51a for weakening the strip along the transverse edge 48 so as to facilitate the folding of the assembled strips after the same emerges from the machine.

Strip assembly station

Referring to Figs. 1a and 2, the strip upon emerging from the feed rolls 43 is fed into the strip assembly station comprising in general a strip interceptor 52, a ram assembly generally identified as 53 and an intermittently driven conveyor generally identified as 54. Within this station the strips are assembled in such a manner that the rear transverse marginal area of one strip is overlapped by the front transverse marginal area of the next succeeding strip.

The strip interceptor 52 is a relatively stiff member attached by means of screws 55 to a bracket 56 in turn secured by means of screws 57 to a connecting bar 58.

Figure 3:
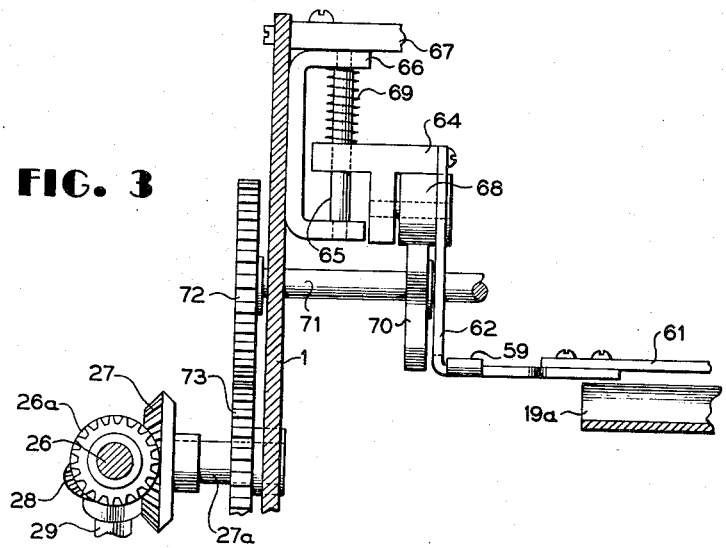

The ram assembly as seen from the top view of Fig. 2 comprises a pair of end members 59 and 60 suitably secured to one another by means of a connecting bar 61. Integrally associated with each end member is a bifurcated structure consisting of a pair of upright arms, such as 62 and 63, shown in Fig. 2. Said arms are suitably secured to a T-shaped member 64, shown in Fig. 3, adapted for reciprocation along a guide rod 65 secured within a bracket 66 in turn secured to a connecting bar 67 attached between the side frames of the machine. The T-shaped member 64 carries a follower roller 68. A compression spring 69 disposed around the guide rod 65 urges the T-shaped member 64 and hence the roller 68 into cooperation with a cam 70 attached to a shaft 71 journaled between the side frames of the machine. It may be appreciated that the structure just described is duplicated at the opposite end of the ram structure.

Continuing, the shaft 71 is provided with a gear 72 engaged to a gear 73 attached to the stud shaft 27a driven in the manner described hereinabove. Thus, by the means described the ram is reciprocated vertically and in timed relation with the feeding of the strip into the assembling station. In its elevated position as indicated at 59a the ram is disposed above the advancing strip and immediately after the strip advance is arrested the ram moves downwardly to place the strip into engagement with the intermittently driven conveyor 54. It may be noted that the ram members 59 and 60 are provided with open slots 59b and 60a (Fig. 2) to avoid interference with the tape pins 75 as the former is moved against the tapes 74. The engagement of the strip with the conveyor occurs specifically between a pair of perforations 50 and a pair of associated tape pins 75.

Conveyor

The conveyor, generally identified as 54 in Fig. 1a, comprises a pair of spaced endless tapes 74, both partially shown in Fig. 2, adapted to be driven by an associated pair of driving drums 79 arranged on a shaft 79a, and a pair of follower drums 80 similarly arranged on a shaft 80a shown in Fig. 1a. Each tape 74 is provided with the spaced pins 75 adapted for engagement with the marginal perforations 50 of the strip S. The tapes are further provided with notches 76 spaced along the inner edges thereof and notches 77 spaced along the outer edges thereof. The notches 76 as will be later appreciated are provided to avoid interference with the die and heating stations through which the tapes pass. The notches 77 are adapted to engage associated spaced teeth 78a projecting above the peripheries of the drums 79 and 80. The teeth 78a form part of a disc 78, one associated with each drum. The drums, as seen in Figs. 1a and 1b, are arranged on their respective shafts 79a and 80a by means of key and spline connections respectively 79b and 80b to enable the drums and their associated tapes to be spaced in accordance with the size of the strips carried thereon. Both shafts 79a and 80a are suitably journaled in the end frames of the machine. The shaft 79a is further provided with a ratchet 81 intermittently driven by means of a cooperating spring biased dog 82 carried on an arm 83 encircling the shaft 79a. The arm 83 is loosely connected to a link 84 in turn loosely connected to an arm 85a forming an integral part of a bell crank 85 pivoted on a stud member 86 secured to a supporting member 95 attached to the die support frame 37. Another arm 85b, associated with said bell crank 85, carries a follower roller 85c disposed to cooperate with an internal cam 87 secured to the shaft 32 driven in the manner earlier described.

The peripheral surfaces of the drums 79 are further provided with detenting notches 88 adapted to be engaged by detent members 89 associated with each drum 79. Each detent is supported in a bearing 90 disposed within the frame 37 associated with the die station. The ensuing description referring to the detent shown and its cooperating parts is likewise duplicated with respect to the other detent not shown. The detent 89 is further provided with annular members 92 between which a follower arm 93 is loosely disposed for reciprocating the detent. The opposite end of said arm 93 is loosely connected at 94 to the supporting member 95. The arm 93 carries a follower roller 96 biased against the inner race of an internal cam 97.

It may be appreciated at this point that the sequence of operation between the detent 89 and the driving tape drums 79 is such that the detent is completely withdrawn from the associated detent notch 88 before the dog 74 communicates a driving action to the ratchet 81 and the drums 79. Immediately after the operating stroke of the dog 74 is completed the detent is caused to be engaged with the drums 79 to lock the drums and thereby maintain the conveyor in a stationary position.

It may be further appreciated that while the conveyor is in a stationary position the ram is in an elevated position 59a as the strip emerges from the feed rolls 43 and is fed against the interceptor 52. Immediately thereafter the ram is moved downwardly to place the strip into engagement with the conveyor. In the next cycle of advancement of the conveyor the strip carried thereon is advanced to a position where the rear transverse margin of the strip is in position to be overlapped by the front transverse margin of the next succeeding strip. As the operation continues the assembled strips eventually are fed into a die station where cutting of the strip is effected along the transverse margins as indicated by discontinuous lines 98 shown in Fig. 6.

Die station

Referring to Figs. 1a and 2, the die station comprises a die block 99 secured by means of screws 100 to the die frames 37 in turn secured by means of bolts 101 to the machine frame 2. The die block is further provided with a guide 99a for facilitating the entry of the strips into the die station. Above the die block 99 is a cutter head 102 suitably attached to a carrier 103 guided for vertical reciprocation along upper guide rods 104, supported in the frame 37, and lower guide rods such as 105 supported by the main frame 2. The head 102 is provided with a plurality of cutting blades 106 for cutting the strips along the lines 98 shown in Fig. 6. A spring biased stripper plate 107 is suitably carried by the head 102 and serves the purpose of clamping the strip before a cutting operation and stripping the same after a cutting operation. The head is further provided with a plurality of spring biased strip aligning pins 108 and 108a, the former and the latter are adapted to engage the marginal perforations respectively 50a and 50b of the strip shown in Fig. 6. In general the perforations and the pins 108 and 108a are substantially of the same size in diameter, the latter however are slightly larger in diameter than the tape pins 75. The difference in the diameter sizes enables the strip to shift relative to the tape pins 75 as the strip is being properly aligned, by means of the pins 108 and 108a, relative to the cutting knives of the die. This arrangement provides an accurate relationship between the cuts 98 and the marginal perforations 50a and 50b for all assembled strips passing through the die station. It may now be appreciated that the tape notches 76 as seen in Fig. 2 provide the necessary clearance for the strip aligning pins 108 and 108a and the cutting blades 106.

Reciprocation of the carrier 103 is effected by means of an active follower roller 109 and a complementary follower roller 110 both of which are adapted for cooperation with a cam 111 secured to the shaft 32. The cam 111 is driven in timed relation with the conveyor so that the cutting of the strips along the lines 98 is effected while the conveyor is at rest. After the cutting operation the strips are fed into the sealing station wherein the strips are exposed to successive applications of heat and pressure along the overlapped transverse areas of the strips.

Sealing station

Referring to Fig. 1b, the sealing station comprises a plurality of upper heating irons 120 and a plurality of opposed lower heating irons 121, the former and the latter being arranged respectively above and below a plane common to the advancing overlapped strips. The heating irons 120 and 121 are each provided with an electrically actuated heating element 122 which when energized causes the members 120 and 121 to be heated to a temperature controlled by a thermostat 123 mounted on the first upper heating iron 120. The upper members 120 are resiliently attached to associated crossbars 124 suitably attached to carrier frames such as 125 arranged for vertical reciprocation along guide rods 126 supported by frames such as 127 attached by means of bolts 128 to the main frame 2. The lower members 121 are also resiliently attached to associated crossbars 129 suitably attached to lower carrier frames such as 130 disposed for vertical reciprocation along the guide rods 126. The lower carrier frame 130 is provided with an extended portion 130a supporting a roller 130b adapted for cooperation with an internal cam 131 attached to a shaft 132. Secured to said shaft 132 is a large gear 133 meshed with the gear 34 driven in the manner earlier described. The lower carrier frame 130 is connected to the upper carrier frame 125 by means of a front set and a rear set of links. The front set, which is shown in part, comprises links 134, 135 and 136. The center link 135 pivots on a stud 137 secured to a horizontal frame 138 attached to the guide rods 126. The rear set comprises links 139, 140 and 141, the center link 140 also pivots on the stud 137 but on the opposite end thereof. It may be appreciated that the mechanism just recited is duplicated at the opposite ends of the carrier frames 125 and 130.

Upon rotation of the internal cam 131 and by means of the linkage described the carrier frames 125 and 130 are reciprocated in unison but in opposition to each other to cause the heating irons 120 and 121 to apply heat and pressure simultaneously to the overlapped transverse areas of the strips.

In order that a consistent and accurate relationship be maintained in the overlapped areas of the assembled strips, ther are provided a double set of aligning pins 142 and 143 suitably disposed on both ends of the first upper heating iron 120. These pins 142 and 143 are adapted to engage the marginal perforations 50b and 50a located immediately adjacent the overlapped area 48 shown in Fig. 7. Thus, the strips are maintained in an accurate overlapped relationship as the heating irons 120 and 121 are reciprocated towards and against the said overlapped areas of the assembled strips. With the application of heat and pressure the overlapped areas are thus secured to form a continuous web.

It may be further observed in Fig. 1b that the notches 76 in the tape 74 are positioned in such a manner as to avoid interference of the tape with the heating irons 120 and 121 and the aligning pins 142 and 143. It may be further appreciated that each overlapped area of the assemled web undergoes successive treatments of heat and pressure before emerging from the machine. This arrangement as opposed to an arrangement having but a single set of heating members, is desirable in that the operating temperature may be maintained at a safe point which would not scorch the strips. Otherwise a single arrangement of heating irons would require a much higher but unsafe temperature and a slower output operation.

In addition to the heating irons 120 and 121, the heating station is further provided with a set of opposed cooling members 120a and 121a adapted to operate in the manner described for the heating irons 120 and 121. The cooling members absorb the heat applied to the overlapped sealed marginal areas thus hastening the sealing action of the adhesive and thereby enabling the web to be produced at a relatively higher rate of speed.

Circuits and operation

Figure 4:
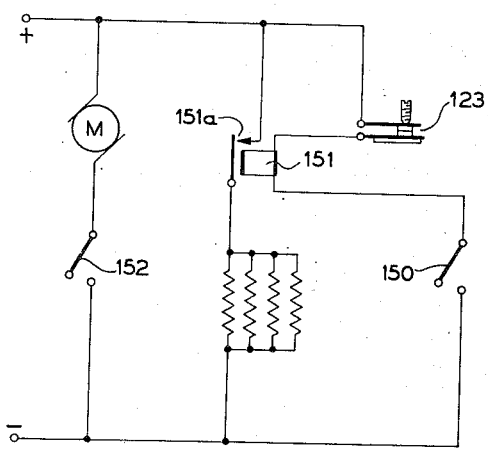
Fig. 4 is a circuit diagram showing briefly the main circuits of the machine.

Referring to Fig. 4, the circuit diagram shows briefly the main operating electrical controls wired to a suitable D. C. power supply indicated by the terminals + and —. The machine is prepared for operation by closing a heating control switch 150 wired in series with a heating control relay 151 and a thermostat 123. Energization of relay 151 causes associated contact points 151a to close thereby completing a circuit to the heating elements 122. After the heating elements have been energized and the heating irons associated therewith are heated to the required temperature, the main switch 152 is closed thereby completing a circuit to the machine driving motor M which operates the various components of the machine.

Referring to Figs. 1a and 1b, the picker knives 9 are oscillated to cause the strips S to be fed singly into the machine, specifically, into feed rolls 42 and 43. The latter convey the strips into the assembling station 53 wherein the ram 59 assumes an elevated position 59a in relation to the feeding of each strip into the assembling station. The forward advance of the strip is temporarily arrested by the interceptor 52 and immediately thereafter the ram is moved downwardly to place the strip upon tape conveyor pins 75 forming a part of the conveyor 54, said pins 75 engaging specifically the marginal perforations 50 of the strip S shown in Fig. 5.

Figure 8:
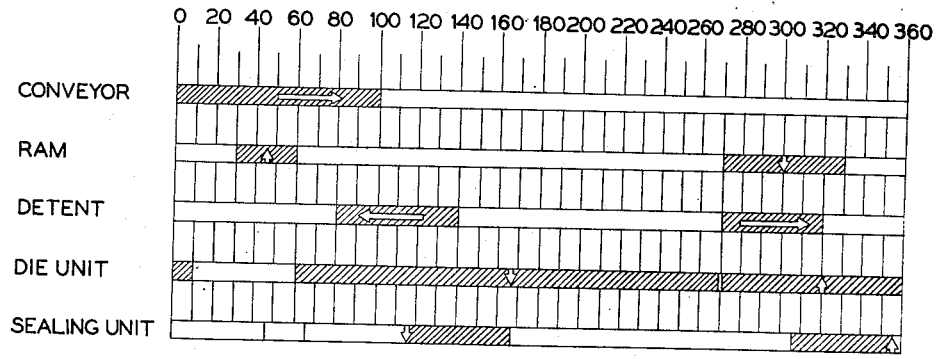
Fig. 8 is a timing chart of the various components comprising the machine.

The time chart shown in Fig. 8 indicates the relationship of the various components of the machine and in this instance it may be appreciated that the conveyor is stationary at the time (270°–330°) the ram is moving downwardly to place the strip upon the conveyor. In the following cycle, the conveyor advance begins at 0° and extends to 100° whereupon the drum detents 89, Fig. 1a, are caused to engage associated drum detenting notches 88 thereby locking the conveyor in position. This detenting action for holding the conveyor 54 at rest, occurs between 80° and 140°. The releasing of the conveyor 54 by the detents 89 occurs between 270° and 320°. The conveyor 54 is advanced by means of the ratchet 81 driven by the cooperating dog 82. When the conveyor advance is terminated, the strip carried thereon is placed in such a position that the lagging transverse marginal area 49 thereof is disposed to be overlapped by the front transverse marginal area 48 of the next succeeding strip. The conveyor, in step-by-step manner, carries the assembled strips into the die station wherein each strip in succession is properly aligned by means of aligning pins 108 and 108a adapted to engage the marginal perforations 50a and 50b of the assemblage shown in Fig. 6.

Each strip after being properly aligned is cut along the lines 98 by the cutters 106 located on the die head 103 moved downwardly between 60° and 270° of the cycle and during which time the related strip is held in a clamped position upon the die block 99 while the conveyor 54 is at rest. Following the cutting operations of the die, the assembled strips are conveyed to the sealing station wherein a plurality of opposed heating irons 120 and 121 are adapted to apply heat and pressure to the overlapped marginal areas. The first upper heating iron 120 is provided with aligning pins 142 and 143 adapted to engage the marginal perforations 50b and 50a located immediately adjacent the overlapped areas of the assembled strips shown in Fig. 7. In this manner the assembled strips are accurately aligned just before the heating members 120 and 121 apply heat and pressure to said overlapped areas. As may be appreciated from the time chart, the heating irons 120 and 121 are adapted to seal the overlapped margins approximately between 115° and 300° during the time the conveyor is at rest. The actual timed operations of the sealing unit indicated on the chart show the closing operation of the heating members 120 and 121 as occurring approximately between 115° and 165°, and the opening up operation occurring approximately between 305° and 355°.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a strip assembling device in combination, a stationary strip intercepting device, means for feeding strips individually to said stationary strip intercepting device whereby the advanced strip is temporarily arrested, a pin type conveyor, a ram associated with said conveyor, means for actuating said ram whereby each arrested strip is positioned on said conveyor, and drive means for intermittently advancing said conveyor in timed relation to said ram actuating means, said conveyor advancement being equivalent to the length of the strip less its marginal dimension whereby the rear margin of the advanced strip is overlapped by the front margin of the next succeeding strip.

2. In a machine for assembling strips in combination, a magazine for supporting a stack of strips, feeding means operable to remove strips individually from said stack, a stationary strip interceptor disposed in the path of the strips, a pin type conveyor, a ram associated with said conveyor, means for reciprocating said ram to place each strip in succession upon said conveyor, and drive means for intermittently advancing said conveyor in timed relation to said ram reciprocating means, said conveyor advance being equivalent to the length of the strip less its marginal dimension whereby the rear margin of the advanced strip is overlapped by the front margin of the next succeeding strip.

3. In a machine of the character described, a magazine for supporting a stack of records having marginal perforations, feeding means cyclically operable to feed records individually from said stack, means for successively intercepting each record fed, a conveyor having spaced pins, a ram associated with said conveyor, means for reciprocating said ram for positioning each record upon said pin conveyor so that pins of the latter enter perforations of the record, and intermittent drive means cyclically operable to advance said conveyor in timed relation to said ram reciprocating means whereby the rear margin of the advanced record is accurately overlapped with the front margin of the next succeeding record.

4. In a machine for assembling strips into a continuous web, means for supporting a stack of strips, feeding means cyclically operable to feed strips individually from said stack, stationary intercepting means disposed in the path of each strip fed, a pin type conveyor, a ram associated with said conveyor, means for reciprocating said ram for placing each strip upon said conveyor, cyclically operable drive means for intermittently advaning said conveyor in timed relation to said reciprocating means whereby successive strips fed on said conveyor are overlapped along marginal areas, and means for securing the overlapped marginal areas.

5. In a machine for assembling a continuous web from individual records having marginal spaced perforations and adhesive covered marginal areas, means for feeding along a path of travel in the machine said records singly from a stack, record intercepting means disposed in said path of travel, a conveyor having spaced pins, said conveyer being disposed with one end thereof below said intercepting means, a ram disposed above said one end of said conveyor and positioned adjacent said intercepting means, reciprocating means for said ram for engaging intercepted records upon said conveyor so that the spaced perforations of each record engage pins on the conveyer, cyclically operable drive means for advancing said conveyor step by step in timed relation to said ram reciprocating means whereby successive intercepted records are placed in overlapped relation along their adhesive covered marginal areas, and means for applying heat and pressure to secure said marginal overlapped areas.

6. In a machine for assembling a continuous web from individual records provided with pin feed perforations spaced along side margins thereof and spaced slits arranged in line adjacent said marginal pin feed perforations for defining the end margins and the central portion of the record, said record further provided with groups of spaced perforations arranged along a line predefining the transverse marginal areas thereof and which areas are provided with a coating of adhesive, said machine comprising means for feeding said records singly from a stack, record intercepting means, a conveyor having spaced record engaging pins, a ram associated with said conveyor, reciprocating means for said ram for successively engaging said records upon said conveyor so that pins of the latter enter the pin feed perforations of the record, cyclically operable drive means for advancing said conveyor step by step in timed relation to said ram reciprocating means whereby successive records are placed in overlapping relation along said adhesive coated marginal areas, a die cutting means for cutting each record along transverse marginal areas extending between said spaced group perforations whereby said transverse marginal areas are defined from said central record portion, said die means including record aligning means for positioning each record preparatory to severing, and sealing means for securing said overlapped transverse marginal areas, said sealing means including aligning means for aligning said records preparatory to sealing.

References Cited in the file of this patent

UNITED STATES PATENTS

| | | |
|---|---|---|
| 2,060,906 | Snyder | Nov. 17, 1936 |
| 2,258,799 | Payne | Oct. 14, 1941 |
| 2,476,250 | Paulsen | July 12, 1949 |